United States Patent
Zenitani et al.

(10) Patent No.: US 9,437,343 B2
(45) Date of Patent: Sep. 6, 2016

(54) PROTON CONDUCTOR (71) Applicant: PANASONIC CORPORATION, Osaka (JP)

(72) Inventors: Yuji Zenitani, Nara (JP); Takashi Nishihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/469,316

(22) Filed: Aug. 26, 2014

(65) Prior Publication Data

US 2015/0021510 A1    Jan. 22, 2015

Related U.S. Application Data (63) Continuation of application No. PCT/JP2014/000352, filed on Jan. 24, 2014.

(30) Foreign Application Priority Data

Jul. 16, 2013  (JP) .................. 2013-147244

(51) Int. Cl.
  H01B 1/08   (2006.01)
  H01M 8/10   (2016.01)

(52) U.S. Cl.
  CPC ............. H01B 1/08 (2013.01); H01M 8/1027 (2013.01); *C04B 2235/3215* (2013.01)

(58) Field of Classification Search
  CPC .......... H01B 1/00; H01B 1/08; H01B 1/122; H01M 8/1027; H01M 8/1067; C04B 2235/3215; C04B 2235/3225; C04B 2235/768

See application file for complete search history.

(56) References Cited

U.S. PATENT DOCUMENTS

| | | | |
|---|---|---|---|
| 2003/0124403 A1 | 7/2003 | Taniguchi | |
| 2010/0196767 A1 | 8/2010 | Sala et al. | |
| 2010/0304229 A1 | 12/2010 | Ito et al. | |
| 2015/0099623 A1* | 4/2015 | Nishihara | C25B 11/04 502/303 |
| 2015/0111129 A1* | 4/2015 | Komori | H01B 1/122 429/482 |
| 2015/0221407 A1* | 8/2015 | Zenitani | H01B 1/00 252/62.2 |

FOREIGN PATENT DOCUMENTS

| | | |
|---|---|---|
| JP | 2000-302550 A | 10/2000 |
| JP | 2005-336022 A | 12/2005 |

(Continued)

OTHER PUBLICATIONS

Han et al "Substantial appearance of origin of conductivity decrease in Y-doped BaZrO3 due to Ba-deficiency", RSC Adv., 2014, 4, 31589-31593 (Jul. 2014).*

(Continued)

*Primary Examiner* — Mark Kopec (74) *Attorney, Agent, or Firm* — McDermott Will & Emery LLP (57) ABSTRACT

An exemplary proton conductor according to the present disclosure has a perovskite-type crystal structure expressed by the compositional formula $A_aB_{1-x}B'_xO_{3-\delta}$. The A element is an alkaline-earth metal and is contained in a range of $0.4<a<0.9$, where the a value represents a mole fraction of this element, and the B' element is a trivalent group 3 or group 13 element and is contained in a range of $0.2<x<0.6$, where the x value represents a mole fraction of this element.

8 Claims, 2 Drawing Sheets (56) References Cited

FOREIGN PATENT DOCUMENTS

| JP | 2007-257937 A | 10/2007 |
|---|---|---|
| JP | 2008-021466 A | 1/2008 |
| JP | 2008-023404 A | 2/2008 |
| JP | 2008-130514 A | 6/2008 |
| JP | 2008-243627 A | 10/2008 |
| JP | 2009-231075 A | 10/2009 |
| JP | 2010-529291 A | 8/2010 |
| JP | 2011-029149 A | 2/2011 |

OTHER PUBLICATIONS

Yamazaki et al "Cation non-stoichiometry in yttrium-doped barium zirconate: phase behavior, microstructure, and proton conductivity", J. Mater. Chem., 2010, 20, 8158-8166 (Aug. 2010).*

Han et al "A comprehensive understanding of structure and site occupancy of Y in Y-doped BaZrO3", J. Mater. Chem. A, 2013, 1, 3027-3033 ( )Jan. 2013).*

K. Shinoda et al., "Determination of Cation Site Occupancy of Dopant in Proton Conducting Barium Zirconate by Powder X-ray Diffraction Utilizing Anomalous Dispersion Effect," (2011), 4 pages, with partial English translation.

D. Pergolesi et al., "High proton conduction in grain-boundary-free yttrium-doped barium zirconate films grown by pulsed laser deposition," Nature Materials, vol. 9, Oct. 2010, pp. 846-852.

G. Ma et al., "Ionic conduction and nonstoichiometry in BaxCe0.90Y0.10O3-a," Solid State Ionics 110 (1998) pp. 103-110.

International Search Report issued in International Application No. PCT/JP2014/000352 issued Mar. 4, 2014.

U.S. Appl. No. 14/469,165, filed Aug. 26, 2014.

U.S. Final Office Action issued on Apr. 21, 2016, in related U.S. Appl. No. 14/469,165.

U.S. Non-Final Office Action issued in related U.S. Appl. No. 14/469,165, mailed on Jul. 22, 2015.

International Search Report issued in International Application No. PCT/JP2014/000515 issued Mar. 4, 2014.

Partial English Translation of Form PCT/ISA/237 (Opinion of the Examiner) for PCT/JP2014/000515.

Proton diffusivity in the BaZr0.9Y0.1 032d proton conductor, Braun et al., J Appl Electrochem (2009) 39:471-475.

Extended European Search Report issued in corresponding European Patent Application No. 14752543.0, mailed Jun. 16, 2016; 10 pgs.

Qian Jun et al., "Microwave Properties of Ceria Complex Calcium Lanthanium Titanate Dielectric Ceramics", Journal of the Chinese Ceramic Society, vol. 35, No. 1, pgs. 41-45 (2007).

* cited by examiner

PROTON CONDUCTOR

This is a continuation of International Application No. PCT/JP2014/000352, with an international filing date of Jan. 24, 2014, which claims priority of Japanese Patent Application No. 2013-147244, filed on Jul. 16, 2013, the contents of which are hereby incorporated by reference.

BACKGROUND

1. Technical Field

The present disclosure relates to a proton conductor.

2. Description of the Related Art

Among proton conducting solid electrolytes, many perovskite-type proton conducting oxides have been reported which are expressed by the compositional formula $AB_{1-x}B'_xO_{3-\delta}$. Herein, A is an alkaline-earth metal; B is a tetravalent group 4 transition metal element, or Ce, which is a tetravalent lanthanoid element; B' is a trivalent group 3 or group 13 element; and O is oxygen. x is a mole fraction of the B' element with which the B element is substituted, satisfying $0<x<1.0$. $\delta$ is a value representing oxygen deficiencies or oxygen excesses. The fundamental construction of a perovskite structure will later be briefly described with reference to the drawings.

Nature materials Vol 9 (October 2010) 846-852 discloses oxides of a perovskite structure. The oxides described in Nature materials Vol 9 (October 2010) 846-852 have the compositional formula $BaZr_{1-x}Y_xO_{3-\delta}$ or the compositional formula $BaCe_{1-x}Y_xO_{3-\delta}$. In these oxides, A is barium (Ba); B is Zr or Ce; and B' is Y.

Japanese Laid-Open Patent Publication No. 2008-23404 discloses a proton conducting film of a perovskite structure. The proton conducting film described in Japanese Laid-Open Patent Publication No. 2008-23404 has the chemical formula $AL_{1-x}M_xO_{3-\alpha}$. A is an alkaline-earth metal. L is one or more kinds of elements selected from cerium, titanium, zirconium, and hafnium. M is one or more kinds of elements selected from neodymium, gallium, aluminum, yttrium, indium, ytterbium, scandium, gadolinium, samarium, and praseodymium. Herein, X is the mole fraction of an M element with which the L element is substituted, where $\alpha$ is an atomic ratio of oxygen deficiencies. In the proton conducting film described in Japanese Laid-Open Patent Publication No. 2008-23404, $0.05<X<0.35$, and $0.15<\alpha<1.00$.

SUMMARY

One non-limiting, illustrative embodiment of present disclosure provides a perovskite-type proton conductor which has high proton conductivity even in a temperature region of not less than 100° C. and not more than 500° C.

In one general aspect, a proton conducting oxide disclosed herein has a perovskite-type crystal structure expressed by the compositional formula $A_aB_{1-x}B'_xO_{3-\delta}$, where A is at least one selected from among alkaline-earth metals; B is a tetravalent group 4 transition metal or Ce; and B' is a trivalent group 3 or group 13 element, where $0.4<a<0.9$ and $0.2<x<0.6$ are satisfied.

According to a non-limiting, illustrative embodiment of present disclosure, a perovskite-type proton conductor having high proton conductivity is provided.

Additional benefits and advantages of the disclosed embodiments will be apparent from the specification and FIGURES. The benefits and/or advantages may be individually provided by the various embodiments and features of the specification and drawings disclosure, and need not all be provided in order to obtain one or more of the same.

DETAILED DESCRIPTION (Perovskite Structure)

Figure 1:
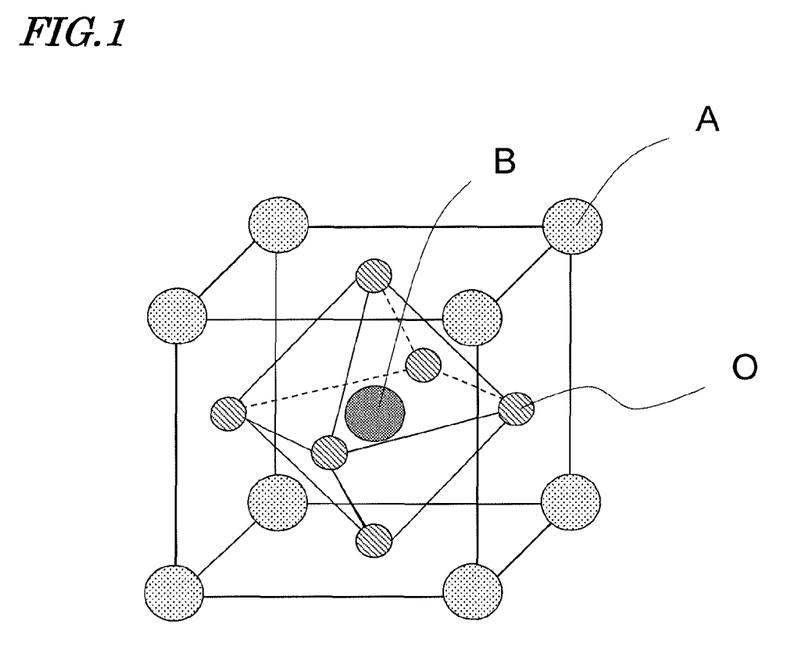
FIG. 1 is a diagram showing a generic perovskite structure expressed by the compositional formula $ABO_3$.

As illustrated in FIG. 1, the generic perovskite structure is composed of elements A, B, and O, and expressed by the compositional formula $ABO_3$. Herein, A is an element which may become a divalent cation; B is an element which may become a tetravalent cation; and O is oxygen. The unit lattice of a crystal having a perovskite structure typically has a near cubic shape. As shown in the figure, ions of element A are located on the eight vertices of the unit lattice. On the other hand, ions of oxygen O are located at the centers of the six faces of the unit lattice. Moreover, an ion of element B is located near the center of the unit lattice. The positions occupied by elements A, B, and O may be called the A site, the B site, and the O site, respectively.

The above structure is the basic structure of a perovskite crystal, in which some of elements A, B, and O may be deficient, excessive, or substituted by other elements. For example, a crystal in which element B' other than element B is located at the B site is a perovskite crystal which is expressed by the compositional formula $AB_{(1-x)}B'_xO_3$. Herein, x is a mole fraction of B', which may be referred to as the substitution ratio. When such substitution, deficiency, or excess of elements occurs, the structure of the unit lattice may distorted or deformed from being a cube. The perovskite crystal is not limited to "cubic", but broadly encompasses any crystal which has undergone a phase transition into the less-symmetric "rhombic" or "tetragonal".

(Findings of the Inventors)

In a conventional proton conducting oxide having a perovskite structure, substituting a tetravalent element B with a trivalent element B' causes oxygen deficiencies in the proton conducting oxide. This is considered because, when some of the tetravalent cations are substituted with trivalent cations, the total positive charge possessed by the cations decreases so that the mole fraction of oxygen ions, which are divalent anions, decreases due to a charge compensation action towards maintaining electrical neutrality, thereby causing oxygen deficiencies. In a proton conducting oxide having such a composition, it is considered that carriers of proton conduction are introduced into the proton conducting oxide as water molecules ($H_2O$) are introduced at the positions (O sites) of oxygen deficiencies.

Conventional proton conducting oxides are considered to exhibit proton conductivity because protons undergo hopping conduction around the oxygen atoms. In this case, temperature dependence of proton conductivity manifests itself in a thermal-activation profile, with an activation energy on the order of 0.4 to 1.0 eV. Therefore, proton conductivity undergoes an exponential decrease with decreasing temperature.

In order for the proton conducting oxide to maintain a high proton conductivity of $10^{-1}$ S/cm (Siemens/centimeter)

or more even in the temperature region of not less than 100° C. and not more than 500° C., it is beneficial to ensure that the activation energy concerning proton conductivity is 0.1 eV or less, thereby suppressing any decrease in proton conductivity that is caused by decreasing temperature.

The inventors have tried to create a situation where protons can move more easily than via conventional hopping by increasing the solid solution amount (amount of substitution) of the trivalent element B' so as to increase the concentration or density of proton carriers. However, in a conventional perovskite-type proton conducting oxide, the upper limit of the mole fraction of the B' element is about 0.2, which presents an upper limit to the amount of oxygen deficiencies.

As a method of introducing more proton carriers, the inventors have noticed the possibility of obtaining similar effects to increasing the mole fraction of the B' element by decreasing the mole fraction of the A element. However, as is described in Solid State Ionics 110 (1998) 103-110, proton conductivity will decrease if the mole fraction a of the A element becomes smaller than 1. The presumable reason is that a component lacking proton conductivity (heterophase: a phase not having the perovskite-type crystal structure) is created within the texture.

Accordingly, the inventors have found that, in a realm of chemical compositions where the mole fraction a of the A element is decreased to below 1, which is conventionally considered unsuitable for proton conduction, increasing the mole fraction x of the B' element to be higher than the conventional 0.2 unexpectedly allows to lower the activation energy while maintaining a single-phase perovskite structure. As a result of this, a perovskite-type proton conducting oxide having high proton conductivity was obtained.

An overview of an exemplary embodiment of present disclosure is as follows.

A proton conductor according to an embodiment has a perovskite-type crystal structure expressed by the compositional formula $A_aB_{1-x}B'_xO_{3-\delta}$, wherein: A is at least one selected from among alkaline-earth metals; B is a tetravalent group 4 transition metal or Ce; and B' is a trivalent group 3 or group 13 element, where $0.4<a<0.9$ and $0.2<x<0.6$ are satisfied.

In one embodiment, A is at least one selected from among Ba and Sr, B is Zr, and B' is Y or In.

In one embodiment, the a value satisfies $0.4<a<0.8$, and the x value satisfies $0.3<x<0.6$.

In one embodiment, the a value satisfies $0.4<a<0.8$, and the x value satisfies $0.4<x<0.6$.

In one embodiment, the a value satisfies $0.4<a<0.6$, and the x value satisfies $0.4<x<0.6$.

In one embodiment, the a value satisfies $0.4<a<0.5$, and the x value satisfies $0.4<x<0.6$.

In one embodiment, an activation energy of proton conduction in a temperature range of not less than 100° C. and not more than 500° C. is 0.1 eV or less.

In one embodiment, the following relationship is satisfied:

$0.21 \le x \le 0.58$;

$a \ge -0.054x + 0.441$; and $a \le -0.027x + 0.886$.

In one embodiment, the proton conductor set forth above is composed of a single phase which is substantially uniform in composition and crystal structure.

(Embodiment 1)

Hereinafter, embodiments will be described.

In an embodiment, the proton conducting oxide of the present disclosure is a metal oxide having a perovskite crystal structure expressed by the compositional formula $A_aB_{1-x}B'_xO_{3-\delta}$. The A element is an alkaline-earth metal. The value a representing the mole fraction of the A element, which is a ratio of the number of atoms of the A element when assuming that a sum of B and B' is 1, is in the range of $0.4<a<0.9$. The B' element is a trivalent group 3 or group 13 element. The value x, which represents the mole fraction of the B element, is in the range of $0.2<x<0.6$. The mole fraction will be described in detail in the Examples described later. Note that, as described above, δ denotes oxygen deficiencies or oxygen excesses. Although the δ value has not been measured in the Examples below, it is considered that oxygen deficiencies exist so that the relationship of $0<\delta<3.0$ is satisfied.

<A Element>

An example of the A element is an alkaline-earth metal. The perovskite structure is stable. Typical examples of the A element are at least one or more kinds of elements selected from among barium (Ba), strontium (Sr), calcium (Ca), and magnesium (Mg). For example, proton conducting oxides whose A element is at least one kind selected from among barium (Ba) and strontium (Sr) can have high proton conductivity. Moreover, the A element may at least contain barium (Ba) and additionally at least one or more kinds of elements selected from among strontium (Sr), calcium (Ca), and magnesium (Mg). For example, the A element is $Ba_yA'_{1-y}(0<y\le1)$.

The A element may be a divalent alkaline-earth metal element, in which case similar effects to increasing the mole fraction of the B' element can be obtained by decreasing the mole fraction of the A element, thus making oxygen deficiencies likely to occur; thus, an effect of enhancing the proton carrier concentration is obtained.

<B Element>

Examples of the B element are group 4 elements. Typical examples of the B element are zirconium (Zr), cerium (Ce), titanium (Ti), and hafnium (Hf). When the B element is zirconium (Zr), the perovskite structure will become stable, thus resulting in less production of any structural components not possessing proton conductivity. This is beneficial because a proton conducting oxide having high proton conductivity will be obtained.

When the B element is zirconium (Zr), titanium (Ti), or hafnium (Hf), which belong to group 4 and are tetravalent, or cerium (Ce), the perovskite structure will become stable, thus resulting in less production of any structural components not possessing proton conductivity, whereby high proton conductivity is obtained.

<B' Element>

The B' element is a group 3 element, a group 13 element, or a trivalent lanthanoid. For example, the B' element may be a group 3 element, a group 13 element, or a trivalent lanthanoid having an ion radius greater than 0.5 Å and smaller than 1.02 Å. As a result, even if the x value is greater than 0.2, a proton conducting oxide having high proton conductivity is obtained whose perovskite structure is maintained stable. It is more beneficial that a proton conducting oxide whose B' element is yttrium (Y) or indium (In) because its perovskite structure is stable and it has a high proton conductivity.

When the B' element is a trivalent group 3 element, a trivalent group 13 element, or a trivalent lanthanoid, such that the element has an ion radius value greater than 0.5 Å and smaller than 1.02 Å, oxygen deficiencies are likely to occur while maintaining a stable perovskite structure, and an effect of enhancing the proton carrier concentration is obtained, even if the x value is greater than 0.2.

(a, x, and δ)

The value a, which represents the mole fraction of the A element is in the range of 0.4<a<0.9. Oxides whose a value is smaller than 0.4 are not desirable because the perovskite structure will be unstable, and a phase not possessing proton conductivity will occur in the proton conducting oxide.

The x value representing the mole fraction of the B' element is in the range of 0.2<x<0.6. Oxides whose a value is greater than 0.6 are not desirable because the perovskite structure will be unstable and a phase not possessing proton conductivity will occur.

Oxides such that 0.9≤a<1.1 and 0≤x≤0.2 are not desirable because the activation energy will be 0.1 eV or greater, thus resulting in a lower proton conductivity in a temperature range of not less than 100° C. and not more than 500° C.

Oxides such that 0.9≤a<1.1 and 0.2<x<0.6 are not desirable because a phase not possessing proton conductivity will occur.

Oxides such that a>1.1 are not desirable because the perovskite structure will be unstable and the proton conductivity will be lowered.

Therefore, it is beneficial that 0.4<a<0.9 and 0.2<x<0.6 are satisfied because, in such proton conducting oxides, a stable perovskite structure will be obtained, and the proton conductivity will be $10^{-1}$ S/cm or more. Oxides such that 0.4<a<0.9 and 0.0≤x≤0.2 are not desirable because, although having a perovskite structure, their proton conductivity will be less than $10^{-1}$ S/cm.

Furthermore, it is more beneficial that 0.4<a<0.8 and 0.3<x<0.6 are satisfied because, in such proton conducting oxides, they possess higher proton conductivity at 500° C. Furthermore, it is more beneficial that 0.4<a<0.8 and 0.4<x<0.6 are satisfied because, in such proton conducting oxides, they have high proton conductivity even at 100° C.

A is a divalent element; B is a tetravalent element; and B' is a trivalent element. O is divalent. Therefore, when the electrical neutrality condition is satisfied, it is considered that a sum of the amount of A deficiencies and a half amount of the amount of B' substitution defines the amount of oxygen deficiencies. In other words, since the amount of A deficiencies is 1−a, the amount of B' substitution is x, and the amount of oxygen deficiencies is δ per unit cell of the crystal, δ=(1−a)+x/2 holds when assuming that ions of these elements satisfy the electrical neutrality condition. Therefore, when 0.4<a<0.9 and 0.2<x<0.6 are satisfied, 0.2<δ<0.9 is satisfied.

According to the present disclosure, a proton conductor is realized which has a single-crystalline or polycrystalline perovskite structure composed of a single phase that is substantially uniform (homogeneous) in composition and crystal structure. Herein, being "composed of a single phase which is substantially uniform in composition and crystal structure" means that the proton conductor does not contain any heterophase that has a composition outside the ranges of the present invention. Note that embodiments of the proton conductor of the present disclosure may contain minute amounts of unavoidable impurities. In the case where the proton conductor of the present disclosure is produced by sintering, compounds or elements of sintering aids or the like may be partially contained. Otherwise, in the course of the production process, impurities may be added unintentionally, or intentionally for certain effects. What is important is that the respective elements of A, B, B', and O are within the ranges defined by the present disclosure, these constituting a perovskite crystal structure. Therefore, impurities which might stray in during production may be contained.

(Production Method)

The proton conducting oxide can be formed by film formation methods such as a sputtering technique, a pulsed laser deposition technique (PLD technique), or a chemical vapor deposition technique (CVD technique). There is no particular limitation as to the film forming method.

(Others)

Proton conducting oxides will also be referred to as proton conductors. An example shape of a proton conducting oxide is a film. A proton conducting oxide does not need to be a continuous film so long as it functions as a proton conducting solid electrolyte.

Moreover, the base substrate on which a film of proton conducting oxide is formed does not need to be flat. When supplying reactants (e.g., hydrogen, oxygen), it is beneficial that there is no leakage of supplied substances in order to prevent the supplied substances from directly reacting via the perovskite-type proton conducting oxide as a solid electrolyte. Therefore, a thin film of perovskite-type proton conducting oxide is formed on a base substrate having a smooth plane which is composed of magnesium oxide (MgO), strontium titanate ($SrTiO_3$), silicon (Si), or the like. Thereafter, for example, a part or a whole of the base substrate is removed by using etching or the like, thereby arriving at a proton conducting solid electrolyte. There is no particular limitation as to the material and shape of the base substrate.

The crystal structure of the proton conducting oxide may be single-crystalline or polycrystalline. A proton conducting oxide having oriented texture by controlling the orientation of crystal growth on a substrate of magnesium oxide (MgO) or strontium titanate ($SrTiO_3$), or on a silicon (Si) substrate having a buffer layer with a controlled lattice constant formed thereon, can have a higher proton conductivity. A proton conducting oxide having single-crystalline texture which is epitaxially grown on a substrate can have a higher proton conductivity. For example, single-crystalline texture can be obtained by controlling the film-formation conditions such as the surface orientation of the substrate, temperature, pressure, and the atmosphere. There is no particular limitation as to the conditions of thin film formation and the crystal system of the thin film.

Hereinafter, the present disclosure will be specifically described by way of Examples.

Example 1

A base substrate (10 mm×10 mm, thickness 0.5 mm) was set on a substrate holder within a vacuum chamber, the substrate holder having a heating mechanism, and the inside of the vacuum chamber was evacuated to a degree of vacuum of about $10^{-3}$ Pa. The material of the base substrate was single-crystalline magnesium oxide (MgO).

After the evacuation, the base substrate was heated at 650° C. to 750° C. An oxygen gas (flow rate: 2 sccm) and an argon gas (flow rate: 8 sccm) were introduced, and the pressure inside the vacuum chamber was adjusted to about 1 Pa.

By using a sintered target having an element ratio of Ba:Zr:Y=7:7:3, a proton conducting oxide was formed into a film by a sputtering technique.

The structure, mole fractions, and proton conductivity of the resultant film of proton conducting oxide were evaluated. Results are shown in Table 1. Hereinafter, the respective evaluation methods and the results thereof will be described. Table 1 also shows Examples 2 to 13 and Comparative Examples 1 to 5, which will be described later.

TABLE 1

| sample | A | a | B' | x | conductivity (S/cm) 100° C. | conductivity (S/cm) 500° C. | activation energy (eV) | crystallinity | impurity phase |
|---|---|---|---|---|---|---|---|---|---|
| Example 1 | Ba | 0.73 | Y | 0.31 | 0.36 | 0.71 | 0.039 | single-crystalline | — |
| Example 2 | Ba | 0.48 | Y | 0.48 | 0.42 | 0.79 | 0.041 | single-crystalline | — |
| Example 3 | Ba | 0.89 | Y | 0.58 | 0.14 | 0.55 | 0.091 | polycrystalline | — |
| Example 4 | Ba | 0.44 | In | 0.22 | 0.32 | 0.57 | 0.036 | single-crystalline | — |
| Example 5 | Ba | 0.71 | Y | 0.41 | 0.39 | 0.79 | 0.042 | single-crystalline | — |
| Example 6 | Ba/Sr | 0.71 | Y | 0.27 | 0.35 | 0.66 | 0.040 | polycrystalline | — |
| Example 7 | Ba/Sr | 0.47 | Y | 0.47 | 0.39 | 0.71 | 0.035 | polycrystalline | — |
| Example 8 | Ba/Sr | 0.88 | Y | 0.58 | 0.15 | 0.57 | 0.077 | polycrystalline | — |
| Example 9 | Ba/Sr | 0.43 | In | 0.21 | 0.29 | 0.55 | 0.037 | single-crystalline | — |
| Example 10 | Ba/Sr | 0.69 | Y | 0.39 | 0.35 | 0.69 | 0.039 | single-crystalline | — |
| Example 11 | Ba | 0.41 | Y | 0.58 | 0.45 | 0.95 | 0.043 | single-crystalline | — |
| Example 12 | Ba | 0.88 | Y | 0.21 | 0.12 | 0.65 | 0.097 | single-crystalline | — |
| Example 13 | Ba | 0.42 | Y | 0.22 | 0.31 | 0.54 | 0.036 | single-crystalline | — |
| Comparative Example 1 | Ba | 0.98 | Y | 0.19 | $2.3 \times 10^{-5}$ | $3.9 \times 10^{-2}$ | 0.428 | single-crystalline | — |
| Comparative Example 2 | Ba | 0.65 | In | 0.13 | 0.01 | $1.3 \times 10^{-2}$ | 0.015 | single-crystalline | — |
| Comparative Example 3 | Ba | 0.35 | Y | 0.32 | $3.2 \times 10^{-6}$ | $8.5 \times 10^{-3}$ | 0.454 | polycrystalline | YES |
| Comparative Example 4 | Sr | 0.78 | Y | 0.68 | $6.5 \times 10^{-6}$ | $9.4 \times 10^{-3}$ | 0.419 | polycrystalline | YES |
| Comparative Example 5 | Sr | 1.01 | Y | 0.45 | $4.3 \times 10^{-6}$ | $8.6 \times 10^{-3}$ | 0.436 | polycrystalline | — |

By using a Cu target, X-ray diffraction of the resultant film of proton conducting oxide was measured. As shown in Table 1, it was confirmed that the proton conducting oxide of Example 1 had a perovskite-type crystal structure and was single-crystalline.

By using inductively coupled plasma spectroscopy (ICP), the mole fractions in the resultant film of proton conducting oxide were examined. As shown in Table 1, in the proton conducting oxide ($A_aB_{1-x}B'_xO_{3-\delta}$) of Example 1, the A element was barium (Ba) and the a value was 0.73. Moreover, the B element was zirconium (Zr); the B' element was yttrium (Y); and the x value was 0.31 (Zr:0.69, Y:0.31).

Figure 2:
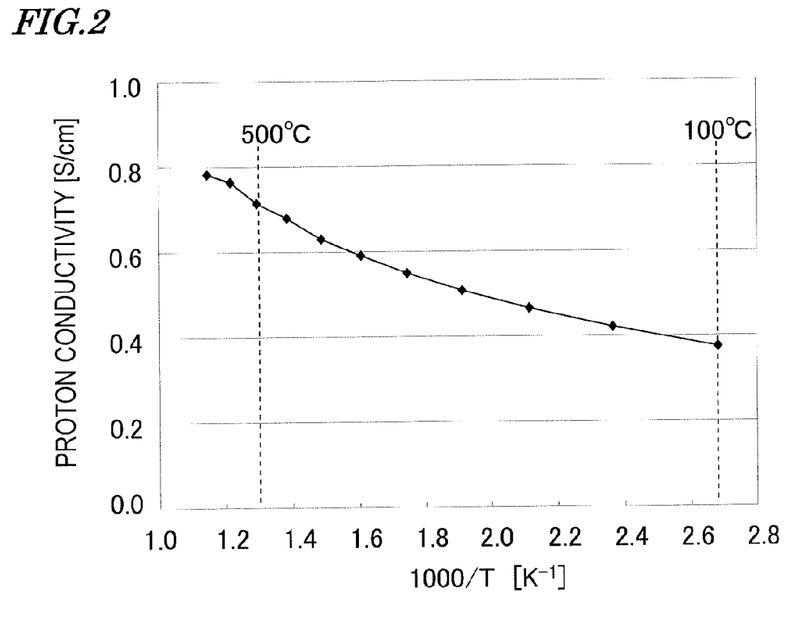
FIG. 2 is a diagram showing proton conductivity in a temperature range from 100° C. to 600° C. according to Example 1.

FIG. 2 shows measurement results of proton conductivity of the proton conducting oxide of Example 1. An electrode was formed by using silver paste on the proton conducting oxide. In an argon (Ar) gas in which 5% hydrogen ($H_2$) was mixed, under a temperature-range condition from 100° C. to 600° C., proton conductivity was measured by using an impedance method.

As shown in Table 1, Example 1 had a proton conductivity of 0.36 S/cm at 100° C., and a proton conductivity of 0.71 S/cm at 500° C.

Example 2

An experiment was conducted similarly to Example 1 except that a film was formed by using a sintered target having an element ratio of Ba:Zr:Y=1:1:1. Table 1 shows the structure, mole fractions, and proton conductivity of the resultant film of proton conducting oxide.

As shown in Table 1, it was confirmed that the proton conducting oxide of Example 2 had a perovskite-type crystal structure and was single-crystalline. As shown in Table 1, in this proton conducting oxide ($A_aB_{1-x}B'_xO_{3-\delta}$), the A element was barium (Ba), and the a value was 0.48. Moreover, the B element was zirconium (Zr); the B' element was yttrium (Y); and the x value was 0.48 (Zr:0.52, Y:0.48). As shown in Table 1, Example 2 had a proton conductivity of 0.42 S/cm at 100° C., and a proton conductivity of 0.79 S/cm at 500° C.

Example 3

An experiment was conducted similarly to Example 1 except that a film was formed by using a sintered target having an element ratio of Ba:Zr:Y=9:4:6. Table 1 shows the structure, mole fractions, and proton conductivity of the resultant film of proton conducting oxide.

As shown in Table 1, it was confirmed that the proton conducting oxide of Example 3 had a perovskite-type crystal structure and was polycrystalline. As shown in Table 1, in this proton conducting oxide ($A_aB_{1-x}B'_xO_{3-\delta}$), the A element was barium (Ba), and the a value was 0.89. Moreover, the B element was zirconium (Zr); the B' element was yttrium (Y); and the x value was 0.58 (Zr:0.42, Y:0.58). As shown in Table 1, Example 3 had a proton conductivity of 0.14 S/cm at 100° C., and a proton conductivity of 0.55 S/cm at 500° C.

Example 4

An experiment was conducted similarly to Example 1 except that a film was formed by using a sintered target having an element ratio of Ba:Zr:In=5:8:2. Table 1 shows the structure, mole fractions, and proton conductivity of the resultant film of proton conducting oxide.

As shown in Table 1, it was confirmed that the proton conducting oxide of Example 4 had a perovskite-type crystal structure and was single-crystalline. As shown in Table 1, in this proton conducting oxide ($A_aB_{1-x}B'_xO_{3-\delta}$), the A element was barium (Ba), and the a value was 0.44. Moreover, the B element was zirconium (Zr); the B' element was indium (In); and the x value was 0.22 (Zr:0.78, In:0.22). As shown in Table 1, Example 4 had a proton conductivity of 0.32 S/cm at 100° C., and a proton conductivity of 0.57 S/cm at 500° C.

Example 5

An experiment was conducted similarly to Example 1 except that a film was formed by using a sintered target having an element ratio of Ba:Zr:Y=8:6:4. Table 1 shows the structure, mole fractions, and proton conductivity of the resultant film of proton conducting oxide.

As shown in Table 1, it was confirmed that the proton conducting oxide of Example 5 had a perovskite-type crystal structure and was single-crystalline. As shown in Table 1, in this proton conducting oxide ($A_aB_{1-x}B'_xO_{3-\delta}$), the A element was barium (Ba), and the a value was 0.71. Moreover, the B element was zirconium (Zr); the B' element was yttrium (Y); and the x value was 0.41 (Zr:0.59, Y:0.41). As shown in Table 1, Example 5 had a proton conductivity of 0.39 S/cm at 100° C., and a proton conductivity of 0.79 S/cm at 500° C.

Example 6

An experiment was conducted similarly to Example 1 except that the material of the base substrate was single-crystalline strontium titanate ($SrTiO_3$), and that the film was formed by using a sintered target having an element ratio of Ba:Sr:Zr:Y=3:4:7:3. Table 1 shows the structure, mole fractions, and proton conductivity of the resultant film of proton conducting oxide.

As shown in Table 1, it was confirmed that the proton conducting oxide of Example 6 had a perovskite-type crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.22 and strontium (Sr) was 0.49, and the a value was 0.71. Moreover, the B element was zirconium (Zr); the B' element was yttrium (Y); and the x value was 0.27 (Zr:0.73, Y:0.27). As shown in Table 1, Example 6 had a proton conductivity of 0.35 S/cm at 100° C., and a proton conductivity of 0.66 S/cm at 500° C.

Example 7

An experiment was conducted similarly to Example 6 except that a film was formed by using a sintered target having an element ratio of Ba:Sr:Zr:Y=1:1:2:2. Table 1 shows the structure, mole fractions, and proton conductivity of the resultant film of proton conducting oxide.

As shown in Table 1, it was confirmed that the proton conducting oxide of Example 7 had a perovskite-type crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.22 and strontium (Sr) was 0.25, and the a value was 0.47. Moreover, the B element was zirconium (Zr); the B' element was yttrium (Y); and the x value was 0.47 (Zr:0.53, Y:0.47). As shown in Table 1, Example 7 had a proton conductivity of 0.39 S/cm at 100° C., and a proton conductivity of 0.71 S/cm at 500° C.

Example 8

An experiment was conducted similarly to Example 6 except that a film was formed by using a sintered target having an element ratio of Ba:Sr:Zr:Y=2:7:4:6. Table 1 shows the structure, mole fractions, and proton conductivity of the resultant film of proton conducting oxide.

As shown in Table 1, it was confirmed that the proton conducting oxide of Example 8 had a perovskite-type crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.20 and strontium (Sr) was 0.68, and the a value was 0.88. Moreover, the B element was zirconium (Zr); the B' element was yttrium (Y); and the x value was 0.58 (Zr:0.42, Y:0.58). As shown in Table 1, Example 8 had a proton conductivity of 0.15 S/cm at 100° C., and a proton conductivity of 0.57 S/cm at 500° C.

Example 9

An experiment was conducted similarly to Example 6 except that a film was formed by using a sintered target having an element ratio of Ba:Sr:Zr:In=4:1:8:2. Table 1 shows the structure, mole fractions, and proton conductivity of the resultant film of proton conducting oxide.

As shown in Table 1, it was confirmed that the proton conducting oxide of Example 9 had a perovskite-type crystal structure and was single-crystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.35 and strontium (Sr) was 0.08, and the a value was 0.43. Moreover, the B element was zirconium (Zr); the B' element was indium (In); and the x value was 0.21 (Zr:0.79, In:0.21). As shown in Table 1, Example 9 had a proton conductivity of 0.29 S/cm at 100° C., and a proton conductivity of 0.55 S/cm at 500° C.

Example 10

An experiment was conducted similarly to Example 6 except that a film was formed by using a sintered target having an element ratio of Ba:Sr:Zr:Y=5:2:6:4. Table 1 shows the structure, mole fractions, and proton conductivity of the resultant film of proton conducting oxide.

As shown in Table 1, it was confirmed that the proton conducting oxide of Example 10 had a perovskite-type crystal structure and was single-crystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.48 and strontium (Sr) was 0.21, and the a value was 0.69. Moreover, the B element was zirconium (Zr); the B' element was yttrium (Y); and the x value was 0.39 (Zr:0.61, Y:0.39). As shown in Table 1, Example 10 had a proton conductivity of 0.35 S/cm at 100° C., and a proton conductivity of 0.69 S/cm at 500° C.

Example 11

An experiment was conducted similarly to Example 1 except that a film was formed by using a sintered target having an element ratio of Ba:Zr:Y=2:2:3. Table 1 shows the structure, mole fractions, and proton conductivity of the resultant film of proton conducting oxide.

As shown in Table 1, it was confirmed that the proton conducting oxide of Example 11 had a perovskite-type crystal structure and was single-crystalline. As shown in Table 1, in this proton conducting oxide ($A_aB_{1-x}B'_xO_{3-\delta}$), the A element was barium (Ba), and the a value was 0.41. Moreover, the B element was zirconium (Zr); the B' element was yttrium (Y); and the x value was 0.58 (Zr:0.42, Y:0.58). As shown in Table 1, Example 11 had a proton conductivity of 0.45 S/cm at 100° C., and a proton conductivity of 0.95 S/cm at 500° C.

Example 12

An experiment was conducted similarly to Example 1 except that a film was formed by using a sintered target having an element ratio of Ba:Zr:Y=9:8:2. Table 1 shows the structure, mole fractions, and proton conductivity of the resultant film of proton conducting oxide.

As shown in Table 1, it was confirmed that the proton conducting oxide of Example 12 had a perovskite-type crystal structure and was single-crystalline. As shown in Table 1, in this proton conducting oxide ($A_aB_{1-x}B'_xO_{3-\delta}$), the A element was barium (Ba), and the a value was 0.88. Moreover, the B element was zirconium (Zr); the B' element was yttrium (Y); and the x value was 0.21 (Zr:0.79, Y:0.21). As shown in Table 1, Example 12 had a proton conductivity of 0.12 S/cm at 100° C., and a proton conductivity of 0.65 S/cm at 500° C.

Example 13

An experiment was conducted similarly to Example 1 except that a film was formed by using a sintered target having an element ratio of Ba:Zr:Y=3:4:1. Table 1 shows the structure, mole fractions, and proton conductivity of the resultant film of proton conducting oxide.

As shown in Table 1, it was confirmed that the proton conducting oxide of Example 13 had a perovskite-type crystal structure and was single-crystalline. As shown in Table 1, in this proton conducting oxide ($A_aB_{1-x}B'_xO_{3-\delta}$), the A element was barium (Ba), and the a value was 0.42. Moreover, the B element was zirconium (Zr); the B' element was yttrium (Y); and the x value was 0.22 (Zr:0.78, Y:0.22). As shown in Table 1, Example 13 had a proton conductivity of 0.31 S/cm at 100° C., and a proton conductivity of 0.54 S/cm at 500° C.

Comparative Example 1

An experiment was conducted similarly to Example 1 except that a film was formed by using a sintered target having an element ratio of Ba:Zr:Y=5:4:1. Table 1 shows the structure, mole fractions, and proton conductivity of the resultant film of proton conducting oxide.

As shown in Table 1, it was confirmed that the proton conducting oxide of Comparative Example 1 had a perovskite-type crystal structure and was single-crystalline. As shown in Table 1, in this oxide ($A_aB_{1-x}B'_xO_{3-\delta}$), the A element was barium (Ba), and the a value was 0.98. Moreover, the B element was zirconium (Zr); the B' element was yttrium (Y); and the x value was 0.19 (Zr:0.81, Y:0.19).

As shown in Table 1, Comparative Example 1 had a proton conductivity of $2.3\times10^{-5}$ S/cm at 100° C., and a proton conductivity of 0.039 S/cm at 500° C.

Comparative Example 2

An experiment was conducted similarly to Example 1 except that a film was formed by using a sintered target having an element ratio of Ba:Zr:In=7:9:1. Table 1 shows the structure, mole fractions, and proton conductivity of the resultant film of proton conducting oxide.

As shown in Table 1, it was confirmed that the proton conducting oxide of Comparative Example 2 had a perovskite-type crystal structure and was single-crystalline. As shown in Table 1, in this oxide ($A_aB_{1-x}B'_xO_{3-\delta}$), the A element was barium (Ba), and the a value was 0.65. Moreover, the B element was zirconium (Zr); the B' element was indium (In); and the x value was 0.13 (Zr:0.87, In:0.13). As shown in Table 1, Comparative Example 2 had a proton conductivity of 0.01 S/cm at 100° C., and a proton conductivity of 0.013 S/cm at 500° C.

Comparative Example 3

An experiment was conducted similarly to Example 1 except that a film was formed by using a sintered target having an element ratio of Ba:Zr:Y=4:7:3. Table 1 shows the structure, mole fractions, and proton conductivity of the resultant film of proton conducting oxide.

As shown in Table 1, the proton conducting oxide of Comparative Example 3 contained a polycrystalline perovskite-type crystal structure. Moreover, zirconium dioxide ($ZrO_2$) was detected as an impurity phase. As shown in Table 1, in this oxide ($A_aB_{1-x}B'_xO_{3-\delta}$), the A element was barium (Ba), and the a value was 0.35. Moreover, the B element was zirconium (Zr); the B' element was yttrium (Y); and the x value was 0.32 (Zr:0.68, Y:0.32). As shown in Table 1, Comparative Example 3 had a proton conductivity of $3.2\times10^{-6}$ S/cm at 100° C., and a proton conductivity of $8.5\times10^{-3}$ S/cm at 500° C.

Comparative Example 4

An experiment was conducted similarly to Example 1 except that the material of the base substrate was single-crystalline strontium titanate ($SrTiO_3$), and that the film was formed by using a sintered target having an element ratio of Sr:Zr:Y=8:3:7. Table 1 shows the structure, mole fractions, and proton conductivity of the resultant film of proton conducting oxide.

As shown in Table 1, the proton conducting oxide of Comparative Example 4 contained a polycrystalline perovskite-type crystal structure. Moreover, barium carbonate ($BaCO_3$) and yttrium oxide ($Y_2O_3$) were also detected as an impurity phase. As shown in Table 1, in this oxide ($A_aB_{1-x}B'_xO_{3-\delta}$), the A element was strontium (Sr), and the a value was 0.78. Moreover, the B element was zirconium (Zr); the B' element was yttrium (Y); and the x value was 0.68 (Zr:0.32, Y:0.68).

As shown in Table 1, Comparative Example 4 had a proton conductivity of $6.5\times10^6$ S/cm at 100° C., and a proton conductivity of $9.4\times10^{-3}$ S/cm at 500° C.

Comparative Example 5

An experiment was conducted similarly to Comparative Example 4 except that a film was formed by using a sintered target having an element ratio of Sr:Zr:Y=5:3:2. Table 1 shows the structure, mole fractions, and proton conductivity of the resultant film of proton conducting oxide.

As shown in Table 1, it was confirmed that the proton conducting oxide of Comparative Example 5 had a perovskite-type crystal structure and was polycrystalline. As shown in Table 1, in this oxide ($A_aB_{1-x}B'_xO_{3-\delta}$), the A element was strontium (Sr), and the a value was 1.01. Moreover, the B element was zirconium (Zr); the B' element was yttrium (Y); and the x value was 0.45 (Zr:0.55, Y:0.45).

As shown in Table 1, Comparative Example 5 had a proton conductivity of $4.3\times10^{-6}$ S/cm at 100° C., and a proton conductivity of $8.6\times10^{-3}$ S/cm at 500° C.

As shown in Table 1, it can be seen that the proton conducting oxides of Examples 1 to 13 had high proton conductivity as compared to Comparative Examples 1 to 5. The proton conducting oxides of Examples 1 to 13 satisfy the conditions of 0.4<a<0.9 and 0.2<x<0.6.

A manufacturing error of at least about 5% is known to exist. From the a and x values of Examples 1 to 13, proton conducting oxides satisfying 0.4<a<0.9 and 0.2<x<0.6 have high proton conductivity.

More specifically, the proton conductor oxides of Example 3, Example 9, Example 11, and Example 12 fall within numerical ranges bounded by the four equations of x=0.21, x=0.58, a=−0.054x+0.441, and a=−0.027x+0.886. That is, in these Examples, the mole fractions x and a satisfy the following relationship.

$$0.21 \leq x \leq 0.58,$$

$$a \geq -0.054x + 0.441, \text{ and}$$

$$a \leq -0.027x + 0.886$$

In the proton conducting oxides of Examples 1 to 13, the activation energies at 100° C. and 500° C. were lower than 0.1 eV. On the other hand, the oxides of Comparative Examples 1 and 3 to 5 had activation energies higher than 0.1 eV. In other words, when the mole fractions satisfy the above conditions (Examples), the proton conducting oxides maintain high proton conductivity of $10^{-1}$ S/cm or more, even in a temperature region of not less than 100° C. and not more than 500° C. Thus, according to the present disclosure, the activation energy of proton conduction can be kept at 0.1 eV or less, whereby a decrease in proton conductivity due to decreasing temperature can be suppressed. Furthermore, proton conducting oxides satisfying the conditions of 0.4<a<0.9 and 0.2<x<0.6 have higher proton conductivity than does the oxide of Comparative Example 2, which has an activation energy of proton conduction of 0.1 eV or less.

From the experiment of the inventors, it has been found that production is facilitated when (1−a), which represents the amount of deficiencies of the A element, is close to the mole fraction x of the B' element. Therefore, it is practically useful if the following relationship is satisfied.

$$0.5 < (1-a)/x < 2.5$$

Moreover, as is clear from Table 1, relatively high proton conductivity is realized when 0.4<a<0.6 and 0.4<x<0.6, and the highest high proton conductivity is realized when 0.4<a<0.5 and 0.4<x<0.6.

Furthermore, the proton conducting oxides of Examples 1, 2, 5, 7, 10, and 11 have higher proton conductivity at 500° C. With a manufacturing error of at least about 5% taken into consideration, the proton conducting oxides of Examples 1, 2, 5, 7, 10, and 11 satisfy the conditions of 0.4<a<0.8 and 0.3<x<0.6. More specifically, the proton conducting oxides of Example 1, 2, 5, 7, 10, and 11 satisfy conditions defined by the numerical ranges of 0.41<a<0.73 and 0.31<x<0.58 plus the manufacturing error.

Furthermore, the proton conducting oxides of Example 2, 5, 7, and 11 have high proton conductivity at 100° C. With a manufacturing error of at least about 5% taken into consideration, the proton conducting oxides of Example 2, 5, 7, and 11 satisfy the conditions of 0.4<a<0.8 and 0.4<x<0.6. More specifically, the proton conducting oxides of Example 2, 5, 7, and 11 satisfy conditions defined by the numerical ranges of 0.41<a<0.71 and 0.41<x<0.58 plus the manufacturing error.

Figure 3:
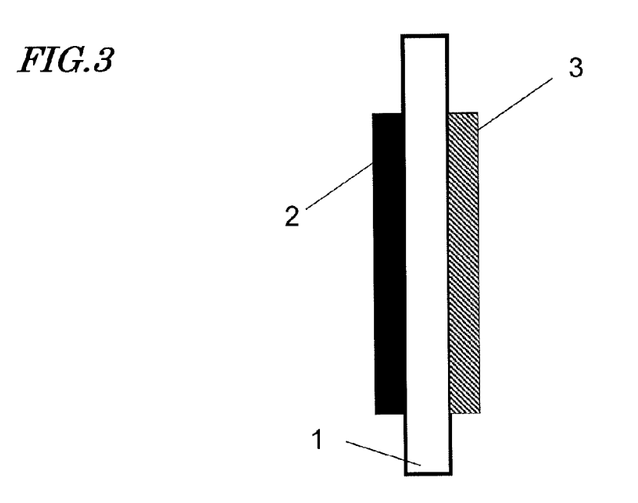
FIG. 3 is a cross-sectional view showing an exemplary device including a proton conductor.

By using the proton conductor of the present disclosure for a known device, a device having high proton conductivity can be provided. FIG. 3 shows an exemplary device having a proton conductor. The device shown in FIG. 3 includes a proton conductor 1, an anode electrode 2, and a cathode electrode 3. Examples of known devices are fuel cells, hydrogen sensors, water vapor electrolytic devices and hydrogenation devices.

A proton conductor according to the present disclosure is used in devices related to hydrogen energy, e.g., fuel cells, hydrogen sensors, water vapor electrolytic devices, and hydrogenation devices, in a structure where it is interposed between an anode electrode and a cathode electrode, and so on.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

What is claimed is:

1. A proton conductor having a perovskite-type crystal structure expressed by the compositional formula $A_aB_{1-x}B'_xO_{3-\delta}$, wherein:
    the proton conductor is composed of a single phase which is substantially uniform in composition and crystal structure,
    A is at least one selected from among alkaline-earth metals,
    B is a tetravalent group 4 transition metal or Ce, and
    B' is a trivalent group 3 or group 13 element,
    where 0.4<a<0.9 and 0.2<x<0.6 are satisfied.

2. The proton conductor of claim 1, wherein:
    A is at least one selected from among Ba and Sr,
    B is Zr, and
    B' is Y or In.

3. The proton conductor of claim 1, wherein:
    0.4<a<0.8, and
    0.3<x<0.6.

4. The proton conductor of claim 1, wherein:
    0.4<a<0.8, and
    0.4<x<0.6.

5. The proton conductor of claim 1, wherein:
    0.4<a<0.6, and
    0.4<x<0.6.

6. The proton conductor of claim 1, wherein:
    0.4<a<0.5, and
    0.4<x<0.6.

7. The proton conductor of claim 1, wherein an activation energy of proton conduction in a temperature range of not less than 100° C. and not more than 500° C. is 0.1 eV or less.

8. The proton conductor of claim 1, wherein the following relationship is satisfied:

$$0.21 \leq x \leq 0.58;$$

$$a \geq -0.054x + 0.441; \text{ and}$$

$$a \leq -0.027x + 0.886.$$

* * * * *